United States Patent
Cho et al.

(10) Patent No.: US 7,549,389 B2
(45) Date of Patent: Jun. 23, 2009

(54) BALL VALVE APPARATUS HAVING A MOISTURE INDICATOR

(75) Inventors: Si-Nam Cho, Seoul (KR); Sang-Bong Lee, Pusan (KR)

(73) Assignee: Essentech Co., Ltd, Inchon (KR)

( * ) Notice: Subject to any disclaimer, the term of this patent is extended or adjusted under 35 U.S.C. 154(b) by 160 days.

(21) Appl. No.: 11/682,479

(22) Filed: Mar. 6, 2007

(65) Prior Publication Data
US 2007/0204634 A1 Sep. 6, 2007

(30) Foreign Application Priority Data
Mar. 6, 2006 (KR) ................. 20-2006-0005954 U

(51) Int. Cl.
*G01N 21/29* (2006.01)
(52) U.S. Cl. ........................................ 116/206; 62/125
(58) Field of Classification Search ................ 116/206, 116/276; 62/125; 73/323
See application file for complete search history.

(56) References Cited
U.S. PATENT DOCUMENTS

| | | | | | |
|---|---|---|---|---|---|
| 2,994,295 | A | * | 8/1961 | Newcum | 116/206 |
| 3,000,345 | A | * | 9/1961 | Gray, Jr. et al. | 116/206 |
| 3,085,424 | A | * | 4/1963 | Berg | 73/29.02 |
| 3,108,566 | A | * | 10/1963 | Chatlos | 116/206 |
| 3,122,124 | A | * | 2/1964 | Yocum | 116/206 |
| 3,142,287 | A | * | 7/1964 | Jones | 116/206 |
| 3,371,648 | A | * | 3/1968 | Farina, Jr. | 116/276 |
| 4,064,826 | A | * | 12/1977 | Pauli | 116/276 |
| 4,655,078 | A | * | 4/1987 | Johnson | 73/168 |
| 4,852,610 | A | * | 8/1989 | McHugh | 137/559 |
| 5,157,936 | A | * | 10/1992 | Wall | 62/292 |
| 5,383,338 | A | * | 1/1995 | Bowsky et al. | 62/125 |
| 5,533,549 | A | * | 7/1996 | Sherman | 137/557 |
| 5,638,689 | A | * | 6/1997 | Scaringe et al. | 62/77 |
| 5,852,937 | A | * | 12/1998 | Westermeyer et al. | 62/125 |
| 6,578,418 | B2 | * | 6/2003 | Dillon | 73/327 |
| 6,923,074 | B2 | * | 8/2005 | Cipolla et al. | 73/861.55 |
| 2002/0083982 | A1 | * | 7/2002 | Gibb | 137/559 |
| 2007/0204634 | A1 | * | 9/2007 | Cho et al. | 62/126 |

FOREIGN PATENT DOCUMENTS
SU 1368726 A1 * 1/1988

* cited by examiner

*Primary Examiner*—R. A. Smith
(74) *Attorney, Agent, or Firm*—Rabin & Berdo, P.C.

(57) ABSTRACT

A ball valve apparatus for a refrigeration system is described. The ball valve apparatus comprises a ball valve for controlling flow of refrigerant and a moisture indicator for showing a moisture content of the refrigerant, and the moisture indicator and the ball valve are formed as one body. Since a moisture indicator and a ball valve are formed as one body, the installation cost and the size of a refrigeration system can be reduced.

1 Claim, 1 Drawing Sheet

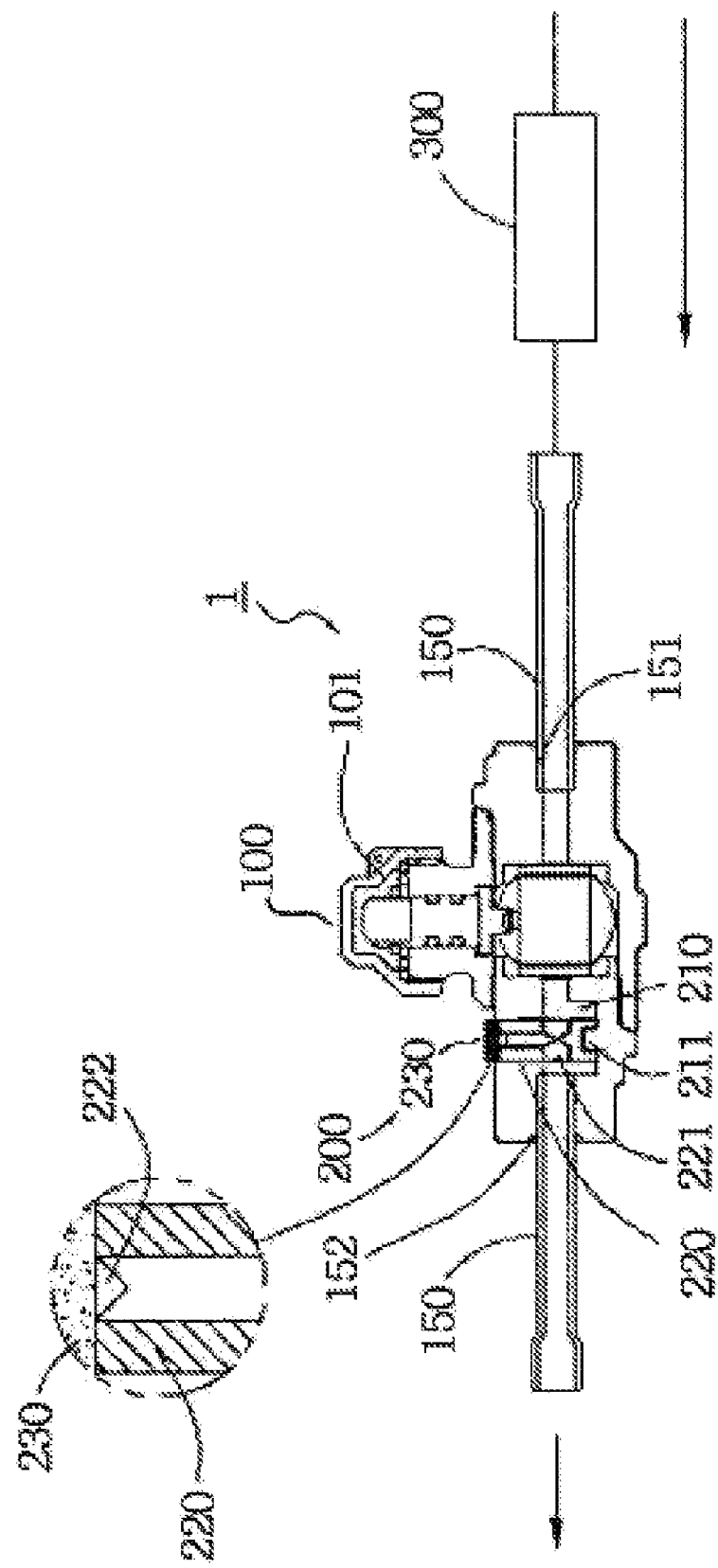

BALL VALVE APPARATUS HAVING A MOISTURE INDICATOR

BACKGROUND OF THE INVENTION (1) Field of the Invention

The present invention relates to a ball valve apparatus to be used in a refrigeration system and particularly to a ball valve apparatus in which a moisture indicator and a ball valve are formed as one body.

(2) Description of the Related Arts

A refrigeration system, such as an air conditioner or a refrigerator, utilizes refrigerant for cooling and many valves for sealing. Particularly, a ball valve is widely used to the refrigeration system, because it has less pressure loss than a shut-off valve and a user can easily open and close it.

In the refrigeration system, moisture may be introduced into the refrigerant from the air or by leaking through pipe joints and valves. Accordingly, a filter drier has been used to the refrigeration system so as to absorb the moisture contained in the refrigerant.

Together with the filter drier, a moisture indicator has been used to check the moisture content of the refrigerant. When the filter drier has completed its span, the moisture content of the refrigerant may be increased. Then, the moisture indicator notifies a user of the increasing of the moisture content.

However, the moisture indicator should be connected with circulation pipes of the refrigeration system. Generally, welding is used to connect the moisture indicator and the pipe. This is not desirable because the cost of the welding is high and the length of the whole system becomes long.

Accordingly, there is a need for an improved installation of a moisture indicator in a refrigeration system.

SUMMARY OF THE INVENTION

It is an object of the present invention to provide a ball valve apparatus having a moisture indicator, which is capable of reducing the installation cost and facilitating maintenance and repairs.

According to an aspect of the present invention there is provided a ball valve apparatus for a refrigeration system.

The ball valve apparatus comprises a ball valve for controlling flow of refrigerant and a moisture indicator for showing a moisture content of the refrigerant, and the moisture indicator and the ball valve are formed as one body.

The moisture indicator comprises a body for containing refrigerant therein, which connects to the ball valve; an indication part for showing a moisture content of the refrigerant, which is arranged to stand upright in the bottom of the body; and a transparent window for allowing a user to check the color of the indication part with the naked eyes, which is formed on the upper surface of the indication part.

The indication part has a shape of a cylinder and also includes at least one hole so as not to disturb the flow of the refrigerant.

BRIEF DESCRIPTION OF THE DRAWINGS

The sole FIGURE is a cross-sectional view showing a ball valve apparatus having a moisture indicator therein according to an embodiment of the present invention.

DETAILED DESCRIPTION OF THE EMBODIMENTS

Referring now to attaching the drawings, a ball valve apparatus according to an embodiment of the present invention will be described in detail.

As shown the sole FIGURE, a ball valve apparatus 1 has a ball valve 100 and a moisture indicator 200 that are formed as one body and arranged in a line. The ball valve 100 controls flow of refrigerant and the moisture indicator 200 shows a moisture content of refrigerant.

The moisture indicator 200 is placed in the right or left side of the ball valve 100. In the sole FIGURE, for example, the moisture indicator 200 is placed in the left side of the ball valve 100.

A filter drier 300 for absorbing moisture contained in refrigerant is placed in the right side of the ball valve apparatus 1. It is desirable that the filter direr 300 is arranged individually with the ball valve 100 because the filter drier 300 should be changed more frequently than the moisture indicator 200.

The ball valve apparatus 1 has an inlet 151 for introducing refrigerant through a circulation pipe 150 and an outlet 152 for exhausting the refrigerant.

The ball valve 100 is usually made of brass to prevent from corrosion. The ball valve 100 has a packing and an adjusting lever 101 for blocking the refrigerant.

The moisture indicator 200 has a body 210 for containing refrigerant therein, an indication part 220 for showing a moisture content of the refrigerant, and a transparent window 230 for allowing a user to check the color of the indication part 220 with the naked eyes.

The body 210 of the moisture indicator 200 has a streamline shape to allow the refrigerant to flow smoothly, and includes a protrusion part 211 in the bottom thereof to fix the indication part 220. Instead of the protrusion part 211, a groove (not shown) of a cylinder shape is formed in the bottom of the body 210. One side of the body 210 is connected to the ball valve 100 and the other side is connected to the outlet 152 of the ball valve apparatus 1.

The indication part 220 is arranged to stand upright in the protrusion part 211 of the body 210. The indication part 220 has a shape of a cylinder having a cavity therein and also includes at least one hole 221 so as not to disturb the flow of the refrigerant.

The transparent window 230 is formed on the upper surface of the indication part 220 to show the status of the indication part 220 with the naked eyes. The window 230 presses the upper surface of the indication part 220. Therefore, the indication part 220 placed in the protrusion part 211 is fixed firmly without rolling due to the refrigerant.

As shown the partial enlarged cross section view of the sole FIGURE, the indication part 220 has a through-groove 222 on the upper side thereof to detect moisture contained in the refrigerant. The through-groove 222 is formed in a V-shape or a U-shape.

The indication part 220 includes a reaction material that reacts on moisture. The color of the material is changed by contacting moisture.

The color of the indication part 220 is changed while the refrigerant passes through the through-groove 222. In case the refrigerant includes little or no moisture, the reaction material of the indication part 220 contacted to the refrigerant shows, for example, green color, and in case the refrigerant includes some of moisture, the material shows, for example, yellow color.

The transparent window 230 allows a user to show the color of the indication part 220. According to the color of the indication part 220, the user determines whether it is required to replace the filter drier 300.

Next, the operation of the ball valve apparatus I according to the present invention will be described below.

As shown the sole FIGURE, the refrigerant is passed through the filter drier 300, the ball valve 100 and the moisture indicator 200 by turns. In normal state, the filter drier 300 absorbs all moisture contained in the refrigerant. However, when the performance of the filter drier 300 is deteriorated or an excessive amount of moisture is contained in the refrigerant, the refrigerant passed through the filter drier 300 may still include moisture.

When the refrigerant containing moisture passes through the through-groove 222 of the indication part 220, the indication part 220 may be contacted with the moisture of the refrigerant. Then, the color of the indication part 220 is changed to a warning color, for example, yellow color. Therefore, the user can identify the changed color of the indication part 220 through the transparent window 230 and replace promptly the filter drier 300 with a new one.

As described above, a moisture indicator formed as one body in a ball valve apparatus according to the present invention can check a moisture content contained in refrigerant passed through a filter drier.

Further, since a moisture indicator and a ball valve are formed as one body, the installation cost and the size of a refrigeration system can be reduced and the maintenance and repair of the system are easily accomplished.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A ball valve apparatus for a refrigeration system, which comprises:
   a ball valve for controlling flow of refrigerant; and
   a moisture indicator for showing a moisture content of the refrigerant;
   wherein the moisture indicator and the ball valve are formed as one body,
   wherein the moisture indicator comprises:
   a body for containing refrigerant therein, which connects to the ball valve;
   an indication part for showing a moisture content of the refrigerant, which is arranged to stand upright in the bottom of the body; and
   a transparent window for allowing a user to check the color of the indication part with the naked eyes, which is formed on the upper surface of the indication part, and
   wherein the indication part has a shape of a cylinder and also includes at least one hole so as not to disturb the flow of the refrigerant.

* * * * *